United States Patent [19]

Amano et al.

[11] Patent Number: 5,376,417
[45] Date of Patent: Dec. 27, 1994

[54] LABEL FOR A SQUEEZABLE CONTAINER AND SQUEEZABLE CONTAINER BEARING SAME

[75] Inventors: Yasuyuki Amano, Urawa; Takeshi Ikeda, Warabi; Eiji Aizawa, Kawaguchi; Takanori Saito, Misato, all of Japan

[73] Assignee: Lintec Corporation, Tokyo, Japan

[21] Appl. No.: 926,671

[22] Filed: Aug. 10, 1992

[30] Foreign Application Priority Data

Aug. 8, 1991 [JP] Japan ................ 3-223373

[51] Int. Cl.5 .............. B32B 27/06; B32B 27/32
[52] U.S. Cl. ........................... 428/40; 283/81; 428/212; 428/213; 428/218; 428/354; 428/500; 428/515; 428/516; 428/517; 428/519; 428/521; 525/240
[58] Field of Search .............. 428/40, 343, 213, 212, 428/354, 500, 515, 516, 218, 517, 519, 521, 500; 283/81; 525/240

[56] References Cited

U.S. PATENT DOCUMENTS

| Re. 32,929 | 5/1989 | Ewing | 428/220 |
| 4,138,026 | 2/1979 | Conklin | 215/12 R |
| 4,418,114 | 11/1983 | Briggs | 428/516 |
| 4,532,189 | 7/1985 | Mueller | 428/516 |
| 4,587,303 | 5/1986 | Turtle | 525/240 |
| 4,678,836 | 7/1987 | McKinney | 425/221 |
| 5,151,309 | 9/1992 | Dollinger | 428/343 |

FOREIGN PATENT DOCUMENTS 1035887  7/1966  United Kingdom .

*Primary Examiner*—Nasser Ahmad
*Attorney, Agent, or Firm*—Millen, White, Zelano & Branigan

[57] ABSTRACT

A label which can conform to the deformations of a squeezable container to which it is affixed and tearing of which during container use does not occur and which can be applied to the containers continuous labeling by automatic labeling machines comprises a single or a multilayer composite polyethylene film attached to a release liner by pressure-sensitive adhesive, which film is formed from a low density polyethylene homopolymer resin and an amount of a linear low density copolymer resin of ethylene and an amount of another α-olefin effective to increase the elastic deformation of the label, either as a mixture thereof in the same layer or as separate layers formed from the homopolymer and from the copolymer, respectively, or from one of them and from a mixture of the homopolymer and the copolymer.

12 Claims, 1 Drawing Sheet

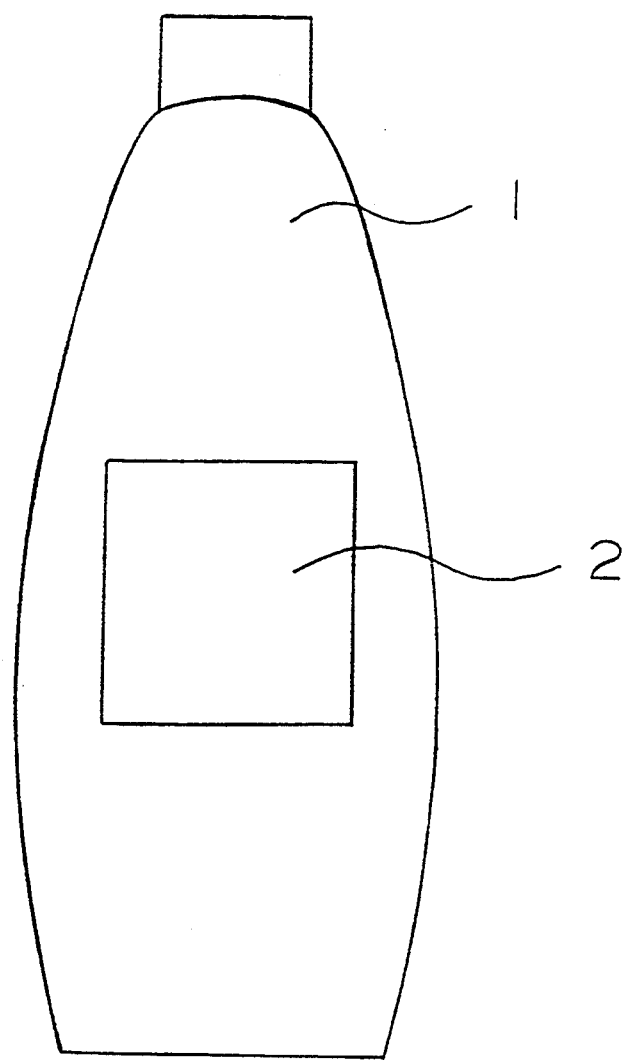

LABEL FOR A SQUEEZABLE CONTAINER AND SQUEEZABLE CONTAINER BEARING SAME

BACKGROUND OF THE INVENTION

1. Field of the Invention

The present invention relates to a novel label adapted for attachment to squeezable containers, such as soft squeezable bottles used for mayonnaise, ketchup, shampoo, and the like, and to a novel squeezable container with the label attached thereto.

2. Description of the Prior Art

Decorative labels are affixed to many containers of commercial products for the purpose of stimulating consumer demand.

Printed label film or label paper is stored as a laminate tape in which the label film or label paper is temporarily attached to a release liner by a layer of a pressure-sensitive adhesive. The label film or the label paper on the release liner is transferred and permanently attached continuously and automatically to the surface of containers of commercial products by charging the label film or the label paper into an automatic labeller continuously.

Hard bottles made of high density polyethylene resins used for dressing and the like are attached with labels made of paper, YUPO ®, PET, and the like. However, soft squeezable bottles used for mayonnaise, ketchup, shampoo, and the like are not affixed with such labels.

Ordinary paper labels, PET labels, synthetic paper labels, polypropylene labels, and the like are not easily attached to the surface of soft squeezable bottles. Moreover, when the contents of the bottles are squeezed therefrom, the labels cannot follow the large deformation formed by the squeezing action, and shearing takes place between the labels an the surface of bottles, resulting in separation of the labels from the surface of the bottles, Even labels made of soft polyvinyl chloride resins compounded with conventional amounts of plasticizers are generally not soft enough to follow the deformation of the squeezing action. When the amounts of the compounded plasticizers are increased to improve the situation, difficulties arise in the printing operations. Moreover, the adhesive property of the labels deteriorates because the adhesive layer is softened by migration of the plasticizers onto the adhesive layer.

A label made of a specific low density polyethylene homopolymer has been proposed for attaching to the surface of soft squeezable bottles (U.S. Pat. No. 4,587,158; International Publication WO 86/01550). Although the proposed label can follow the deformation, it creates a problem in the labeling operation because separation from the release liner does not occur smoothly in the automatic labeling process.

When a low density polyethylene resin is utilized, a film exclusively made of low density polyethylene causes high rates of defective products in the process of automatically labeling the squeezable bottles. Thus, this type of film is not suitable for labeling such bottles.

SUMMARY OF THE INVENTION

Accordingly, an object of the present invention is to provide a label for squeezable containers which can conform to the large deformation which occurs in squeezable containers and also have suitable properties for use in automatic labeling equipment.

Another object of the present invention is to provide a squeezable container with the label attached thereto.

Upon further study of the specification and appended claims, further objects and advantages of this invention will become apparent to those skilled in the art.

The present invention has been completed as a result of extensive investigations undertaken to improve the labeling properties of low density polyethylene resins when they are utilized for preparation of labels to apply to squeezable bottles, leading to the discovery that the above-described objects can be achieved by forming the label from a composition comprising both a linear, low density polyethylene homopolymer resin and an amount of a linear, low density copolymer resin of ethylene and another α-olefin effective to increase the elastic deformability of the film enough to permit the label to be used on squeezable containers, either as a single-layer film or a multilayer composite film comprising one or more layers of a linear, low density polyethylene homopolymer resin and one or more layers of a low density copolymer resin of ethylene and another α-olefin.

Thus, in various aspects, the present invention relates to the following:

(1) a label for a squeezable container comprising a release liner and a film attached to the release liner with a pressure-sensitive adhesive, the film being formed of a composition comprising 20–95 wt% of the low density polyethylene homopolymer resin and 80–5 wt% of the linear, low density copolymer resin of ethylene and a second α-olefin;

(2) a label for a squeezable container comprising a release liner and a multilayer composite film attached to the release liner with a pressure-sensitive adhesive, the multilayer composite film comprising at least one layer of the low density polyethylene homopolymer resin and at least one layer of the linear low density copolymer resin of ethylene and another α-olefin;

(3) a label for a squeezable container comprising a release liner and a multilayer composite film attached to the release liner with a pressure-sensitive adhesive, the multilayer composite film comprising at least one layer of either the low density polyethylene homopolymer resin or the linear low density copolymer resin of ethylene and at least one layer of a composition comprising 10–95 wt% of the low density polyethylene homopolymer resin and 90–5 wt% of the linear, low density copolymer resin of ethylene and another α-olefin;

(4) a squeezable container with a label affixed thereto on its outer surface by a pressure-sensitive adhesive which comprises a film formed of a composition comprising 20–95 wt% of the low density polyethylene homopolymer resin and 80–5 wt% of the linear low density copolymer resin of ethylene and another α-olefin;

(5) a squeezable container with a label affixed thereto by a pressure-sensitive adhesive, the label comprising a multilayer composite film formed of at least one layer of the low density polyethylene homopolymer resin and at least one layer of the linear low density copolymer resin of ethylene and another α-olefin;

(6) a squeezable container with a label affixed thereto by a pressure-sensitive adhesive, which label comprises a multilayer composite film comprising either at least one layer of the low density polyethylene homopolymer resin and at least one layer of a composition comprising 10–95 wt% of the low density polyethylene homopolymer resin and 90–5 wt% of the linear low density copolymer resin of ethylene and a pressure-sensitive adhesive applied to the surface of the multilayer composite film.

BRIEF DESCRIPTION OF THE DRAWING

The invention will be described with reference to the accompanying drawing, which is a plan view of a squeezable container 1 for mayonnaise (not shown) which was used for the squeezing test described hereinafter, bearing the label 2 of this invention affixed thereto by a pressure-sensitive adhesive (not shown).

DETAILED DESCRIPTION OF THE INVENTION

The label of the invention exhibits its unique properties because of the film of which the label is comprised, which film is formed from a composition comprising a low density polyethylene homopolymer resin and a linear, low density copolymer resin of ethylene and another α-olefin and is a monolayer mixture of the two resins or is a multilayer composite film comprising one or more layers of the former resin and one or more layers of the latter resin.

The low density polyethylene homopolymer resin utilized in the film is a low density resin, preferably in the range of from 0.920–0.930 g/cm$^3$, more preferably of from 0.925–0.930 g/cm$^3$, and has a melt index which preferably is in the range of from 0.5–7.0, more preferably of from 0.5–2.5.

The linear, low density copolymer resin of ethylene and an another α-olefin utilized in the film also is a low density resin and has a density preferably in the range of from 0.920–0.940 g/cm$^3$, more preferably, in the range of from 0.935–0.940, and a melt index preferably in the range of from 0.5–5.0, more preferably of from 0.5–2.5.

The melt index is measured according to the method of ASTM D1238, which is equivalent to the method of Japanese Industrial Standard K 7210.

The linear low density copolymer resin is preferably a copolymer of ethylene and an α-olefin having 4–8 carbon atoms. It is more preferably a copolymer of ethylene and an α-olefin having 6 carbon atoms, e.g., isohexene.

The type of release liner of the label of the invention is not particularly limited, and any conventional kind of release liner can be utilized. For example, a release liner prepared by coating a silicone releasing agent on a sheet of paper which is preliminarily treated with a sealing agent may suitable be utilized.

The label of the invention may be prepared by coating the pressure-sensitive adhesive directly onto one face of the film, followed by application of the release liner to the face of the film coated with the pressure-sensitive adhesive or by coating one face of the release liner with the pressure-sensitive adhesive, followed by continuous application of the film to the face of the release liner coated with the pressure-sensitive adhesive.

The type of pressure-sensitive adhesive employed in the label is not particularly limited, except for an ability to adhere as a continuous film to a face of the low density polyethylene film, and a suitable pressure-sensitive adhesive may be selected and utilized from among conventional, generally utilized, commercially available pressure-sensitive adhesives according to the conditions of use.

The width of the label of the invention is adjusted so as to be slightly wider than the width of the area of the squeezable container to which the label is attached.

It is desirable that the surface of the film which is to become the outer face of the label of the invention has a preliminary surface treatment which renders it more receptive to printing, e.g., by corona discharge or by coating with a polyester-type coating material, so that decorative printing can be effected easily on the label prepared therefrom.

The squeezable container or the container in the invention is a bottle container or a tube container from which the contents thereof can be squeezed out by holding the container upside down and squeezing it, such as the containers currently used for fluid foods, e.g., mayonnaise, ketchup, and fluid cosmetics, e.g., shampoo.

In the first aspect (1) of the invention described above, the film is made of a composition comprising 20–95 wt% of a low density polyethylene homopolymer resin and 80–5 wt% of a linear, low density copolymer resin of ethylene and another α-olefin. The amount of the copolymer resin compounded in the composition is preferably in the range of from 10–60 wt%, more preferably in the range of from 20–50 wt%.

The thickness of the film is not particularly limited as long as the film is sufficiently long and strong to follow the deformations of the container which occur during use. The thickness is generally in the range of from 40–200 μm, preferably in the range of from 40–120 μm, like the thickness of conventional films for labels.

The film made of the composition (1) of the invention may be a multilayer film having two or more layers. The content of the linear, low density polyethylene resin may be varied from layer to layer in the multilayer film. A layer having the property of easily following the deformations of a squeezable bottle to which it is affixed, such as a layer of a soft polyvinyl chloride resin, also may be inserted between layers of films formed from the composition (1) of the invention.

In the second (2) aspect of the invention described above, the label is formed from a multilayer composite film comprising one or more layers of a low density polyethylene homopolymer resin and one or more layers of linear, low density copolymer resin of ethylene and another α-olefin. The ratio of the weight of the layer of the low density homopolymer resin to the thickness of the layer of the linear, low density copolymer resin is generally in the range of from 5–80 wt%, preferably of from 10–60 wt%, and more preferably of from 20–50 wt%. The total thickness of the multilayer composite film is not particularly limited but generally is in the range of from 40–250 μm, preferably of from 40–150 μm, viz., the thickness of conventional films for labels.

The number of layers of the low density homopolymer resin and the number of layers of the linear, low density copolymer resin each may be one or more, i.e., the multilayer composite film may be a dual layer composite film or a triple or more layer composite layer. A preferable construction of the multilayer composite film is a triple layer composite comprising a layer of linear, low density copolymer sandwiched between two layers of low density ethylene homopolymer.

In the third (3) aspect of the invention described above, the film is a multilayer composite film in which a first layer thereof is the low density homopolymer resin, a second layer thereof is either another layer of the low density homopolymer or of the linear, low density copolymer resin and a third layer is a composition comprising 10–95 wt% of a low density polyethylene resin and 90–5 wt% of a linear, low density polyethylene resin.

Which layer of a multilayer composite film label of the invention is to become the inner face of the label to which the pressure-sensitive adhesive to be applied is not particularly limited. However, it is preferred that the pressure-sensitive adhesive be applied to the surface of a layer of a low density ethylene homopolymer.

According to the invention, the properties of the low density polyethylene as a label are improved by utilizing the linear, low density polyethylene homopolymer resin in combination with a copolymer of ethylene and another α-olefin. The properties as a label can also be improved by blending the low density polyethylene resin with a medium density polyethylene resin or a high density polyethylene resin, but in these cases the ability of the film to conform to the deformations of squeezable containers deteriorates, and the label comprising such a film is not suitable for utilizing for the squeezing containers. The property of film as a label is dependent upon the toughness required of the film when the label is to be peeled off from the backing sheet using an automatic labeling machine. Such toughness and the property of being able to conform to the deformations (related to softness) of a plastic film required of a label affixed to a squeezable bottle are generally in a contradictory relation.

According to this invention, the problem of these contradictory requirements is solved by utilizing as a component of the composition used to form the label the linear, low density copolymer resin and/or by utilizing a multilayer composite film comprising as one of the layers the linear, low density copolymer resin in combination with the layer of the low density ethylene homopolymer resin.

The reason that the property of the film as a label is improved by utilizing the linear, low density copolymer resin as a component may be the result of an increase in the Young's modulus of the film by the incorporation of the linear, low density copolymer resin.

The Young's modulus of the label of the invention is preferably in the range of from 1500–4500 kg/cm$^2$, more preferably in the range from 2500–3500 kg/cm$^2$. When the Young's modulus is lower, the property of the film as a label tends to be inferior; and, when it is higher, the property of being able to conform to the deformations of a squeezable container to which the label is affixed tends to become inferior.

It is preferred that the film comprised in the label of the invention has a high tensile strength in addition to the preferred Young's modulus so that tearing of the film in the label caused by large deformation of the squeezable containers to which they are affixed can be prevented. The tensile strength required for this purpose varies depending on the degree of deformation to which the containers bearing the labels are subjected during the service. The tensile strength of the film is preferably 250 kg/cm$^2$ or more, more preferably 275 kg/cm$^2$, or more and most preferably in the range of from 280–320 kg/cm$^2$.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents, and publications, cited above and below, and of corresponding Japanese Application No. 223373/1991, filed Aug. 8, 1991, are hereby incorporated by reference.

EXAMPLES

Preparation of Label A

A resin compound comprising 80 wt% of a low density polyethylene homopolymer resin having a density of 0.929 g/cm$^3$ and a melt index of 1.5 wt% and 20 wt% of a linear, low density copolymer resin composed of units of ethylene and units of isohexene-1 and having a density of 0.935 g/cm$^3$ and a melt index of 2.5 were used to form the film.

Two kinds of long film having thicknesses of 70 μm and 100 μm, respectively, were prepared by an inflation process from these resins. The tensile strength and the Young's modulus of the film were 280 kg/cm$^2$ and 2900 kg/cm$^2$, respectively.

An acrylic pressure-sensitive adhesive PA-T$_1$ was coated onto a long roll of a release linear 8KA (a product of LINTEC CORPORATION) and the coated release liner was applied continuously to the film prepared above.

The surface of the film prepared above was coated with a conventional top coat for printing to make printing easier.

A long tape of label A having a 60 mm width was prepared from the film and stored in the form of a roll until it was used for the automatic labeling test.

Preparation of Label B

A resin compound comprising 50 wt% of a low density polyethylene homopolymer resin having a density of 0.922 g/cm$^3$ and a melt index of 2.0 and 50 wt% of a linear density copolymer resin of ethylene and n-hexene-1 having a density of 0.930 g/cm$^3$ and a melt index of 1.5 were used to form the film.

A long film having a thickness of 70 μm was prepared from the film by an inflation process. The tensile strength and the Young's modulus of the film were 290 kg/cm$^2$ and 2500 kg/cm$^2$, respectively.

A long tape of label B was prepared from the film in the same way as label A and stored in the form of a roll until it was used for the automatic labeling test.

Preparation of Label C

A resin compound comprising 70 wt% of a low density polyethylene homopolymer resin having a density of 0.928 g/cm$^3$ and a melt index of 5.0 and 30 wt% of a linear low density copolymer resin of ethylene and isohexene-1 having a density of 0.935 g/cm$^3$ and a melt index of 2.5 were used to form the films.

Two long films having thicknesses of 70 μm and 60 μm, respectively, were prepared by an inflation process from this material. The tensile strength and the Young's modulus of the films were 300 kg/cm$^2$ and 3000 kg/cm$^2$, respectively.

A long tape of label C was prepared from the films in the same way as label A and stored in the form of a roll unit it was used for the automatic labeling test.

Preparation of Label D Comprising a Multilayer Composite Film

A three-layer composite film comprising a layer of a low density polyethylene homopolymer resin having a density of 0.922 g/cm$^3$, a melt index of 2.0, and a thickness of 25 μm; a layer of linear, low density copolymer resin of ethylene and n-hexene-1 having a density of 0.930 g/cm$^3$, a melt index of 1.5, and a thickness of 50 μm; and another layer of a low density polyethylene homopolymer resin having a density of 0.922 g/cm$^3$, a melt index of 2.0, and a thickness of 25 μm was prepared by the coextrusion inflation process.

The tensile strength and the Young's modulus of the composite film, which had thickness of 100 μm, prepared therefrom were 340 kg/cm$^2$ and 2500 kg/cm$^2$, respectively A long tape of label D was prepared in the same way as in label A and stored in the form a roll until it was used for the automatic labeling test.

Squeezing Test

The method of the squeezing test was as follows:

A sample label (50 mm×50 mm) was peeled from the release liner and the label then manually attached to the central part of a commercial squeezable mayonnaise bottle (shown in FIG. 1), the outer surface layer of which was a layer of a low density polyethylene. The central part of the label was pushed inwardly until the inner face of the wall of the bottle to which it was affixed touched inner face of the opposite side of the bottle. This action was repeated 50 times.

A sample label (50 mm×50 mm) was taken from each of the two kinds of label A, the one kind of label B, the two kinds of label C, and the one kind of label D, and each was subjected to the above-described squeezing test.

All samples from the six kinds of the label were attached to the surface of the bottle without difficulty, and no change was observed on the condition of any of the attached labels after the test.

As comparative examples a label prepared from a PET film of 50 μm thickness (a product of Toray Company Ltd.), a label using a synthetic paper YUPO ® of 60 μm thickness (a product of Oji Yuka Company Ltd.) and a label prepared using a PVC film of 80 μm thickness (a product of Achilles Company Ltd.) were prepared by the same method as label A and subjected to the same squeezing test.

Results of the test were as follows:

Label Prepared Using the PET Film

The label could not conform to the curved surface of the bottle and, therefore, wrinkles formed in the label when it was forced against the surface of the bottle. The label thus failed the application of the label to the surface of the bottle test.

Label Prepared Using Synthetic Paper YUPO ®

The label could be attached to the surface of the bottle, although small wrinkles were formed. It separated at its ends after 11 times in the squeezing action test.

Label Prepared Using PVC

The label could be attached to the surface of the bottle without formation of any wrinkles. However, it separated at its ends after 32 times in the squeezing action test.

Automatic Labeling Test

The method of the automatic labeling test was as follows:

Sample labels of 40 mm×50 mm each were cut out successively from the film layer of a long tape of a label prepared in the form a roll; the cut-out sample labels were left on the surface of the release liner while the other portions of the film were removed continuously from the surface of the release liner; the sheet of the release liner having the sample labels attached to it was charged to a labeling machine (LINTEC MD-1 ®, a product of LINTEC Corporation) at a labeling speed of 26 M/min. The sample labels were automatically attached to commercial squeezable mayonnaise bottles, and the number of defective labeling in every 300 labelings was counted. Defective labeling included labels which failed to properly attach to the bottle, labels which were erroneously positioned on the bottles, and labels which were attached with wrinkles.

The six kinds of the label of this invention prepared above were evaluated by this method. No defective labeling was found in the 300 labels tested.

As comparative examples, labels E and F were prepared from a low density polyethylene film having a density of 0.923 g/cm$^3$, a Young's modulus of 2000 kg/cm$^2$, and a thickness of 75 μm and from a low density, polyethylene film having density of 0.929 g/cm, a Young's modulus of 2300 kg/cm$^2$, and thickness of 70 μm, respectively, by the same method as in preparation of label A and subsequently subjected to the automatic labeling test.

The results of the test were as follows:

Label E: 63 defective labelings were found among 300 labelings.

Label F: 55 defective labelings were found among 300 labelings.

To summarize the advantages obtained by the invention, the label of this invention can conform to the large deformations which occur during use of the wall to which they are attached of squeezable containers by the effect of the elastic deformation of the label and separation of the label from the containers and tearing of the label are thereby prevented. It has the advantage that continuous labeling thereof with automatic labeling machines is possible. The squeezable container of the invention has the advantage that the label attached to it is not separated from the container or torn during use.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A deformable label suitable for use on a squeezable container comprising a polyethylene film and a release liner removably attached thereto with a pressure-sensitive adhesive, wherein the Young's Modulus of said label is from 1500–4500 kg/cm$^2$ and the tensile strength is 250 kg/cm$^2$ or more, wherein the polyethylene film consists essentially of a low density ethylene homopolymer having a density of 0.920 to 0.930 gm/cm$^3$ and a linear low density copolymer of ethylene and another α-olefin of 4-8 carbon atoms and said copolymer having a density of 0.920 to 0.940 gm/cm$^3$ and present in an amount effective to increase the elastic deformability of the film which will prevent said label from breaking or peeling-off from a squeezable container.

2. A label as in claim 1, wherein the film comprises a resin composition comprising 20-95% by weight of the low density ethylene homopolymer and 80-5% by weight of the linear low density copolymer.

3. A label as in claim 1, wherein the α-olefin is isohexene.

4. A label as in claim 1, wherein the film is a multilayer composite film, at least one layer of which is formed from the low density ethylene homopolymer and at least one layer of which is formed from the linear low density copolymer.

5. A label as in claim 1, wherein the film is a multilayer composite film, at least one layer of which is formed from either the low density ethylene homopolymer or the linear low density copolymer, and at least one layer of which is formed from a resin composition comprising 10-95% by weight of the low density ethylene homopolymer and 90-5% by weight of the linear low density copolymer.

6. A label as in claim 5, wherein the outer layers thereof are formed from the low density homopolymer, and an inner layer thereof is formed from the mixture of the low density ethylene homopolymer and the linear low density copolymer.

7. A label for a squeezable container as in claim 1, wherein the Young's modulus of the label is from 2300-3500 kg/cm$^2$.

8. A label for a squeezable container as in claim 1, wherein the densities of the low density ethylene homopolymer and of the linear low density copolymer are from 0.925 g/cm$^3$ to 0.930 g/cm$^3$ and from 0.935 g/cm$^3$ to 0.940 g/cm$^3$, respectively.

9. A label as in claim 1, wherein the melt index values of the low density ethylene homopolymer and of the linear low density copolymer are from 0.5-2.5 and from 0.5-2.5, respectively.

10. A label as in claim 1, wherein the film comprises 50-80% by weight of the low density ethylene homopolymer and 20-50% by weight of a linear low density copolymer.

11. A label as in claim 1, wherein the Young's modulus of the label is from 2300-3500 kg/cm$^2$; the densities of the low density ethylene homopolymer and of the linear low density copolymer are from 0.925 g/cm$^3$ to 0.930 g/cm$^3$ and from 0.935 g/cm$^3$ to 0.940 g/cm$^3$, respectively; the melt index values of the low density ethylene homopolymer and of the linear low density copolymer are from 0.5-2.5 and from 0.5-2.5, respectively; and the film comprises 50-80% by weight of the low density ethylene homopolymer and 20-50% by weight of a linear low density copolymer.

12. The label of claim 1, wherein the tensile strength of the film is 250-320 kg/cm$^2$.

* * * * *